US012623441B2

(12) United States Patent
Brinkman et al.

(10) Patent No.: US 12,623,441 B2
(45) Date of Patent: May 12, 2026

(54) FIRE-RESISTANT GLAZING

(71) Applicant: Pilkington Group Limited, Lathom (GB)

(72) Inventors: Nils Brinkman, Essen (DE); Matthias Auth, Essen (DE); Andreas Poersch, Gelsenkirchen (DE)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 18/572,359

(22) PCT Filed: Jun. 28, 2022

(86) PCT No.: PCT/GB2022/051651
§ 371 (c)(1),
(2) Date: Dec. 20, 2023

(87) PCT Pub. No.: WO2023/275528
PCT Pub. Date: Jan. 5, 2023

(65) Prior Publication Data
US 2024/0286386 A1    Aug. 29, 2024

(30) Foreign Application Priority Data

Jun. 30, 2021    (GB) ...................................... 2109408

(51) Int. Cl.
*B32B 3/10*        (2006.01)
*B32B 17/10*       (2006.01)
(52) U.S. Cl.
CPC .. *B32B 17/10311* (2013.01); *B32B 17/10036* (2013.01); *B32B 17/10293* (2013.01); *B32B 17/1099* (2013.01); *B32B 2307/3065* (2013.01); *B32B 2307/72* (2013.01); *B32B 2313/04* (2013.01)

(58) Field of Classification Search
None
See application file for complete search history.

(56) References Cited

U.S. PATENT DOCUMENTS 5,219,630  A  *  6/1993  Hickman .......... B32B 17/10761
                                                    156/107
2020/0308828 A9*  10/2020  Crook ..................... E06B 5/165

FOREIGN PATENT DOCUMENTS

CH        711993 A2     6/2017
EP        1205524 A2 *  5/2002  .......... B32B 17/069
GB        2571087 A      8/2019

OTHER PUBLICATIONS

Machine translation of EP-1205524-A2 (Year: 2002).*
Intellectual Property Office of United Kingdom, Search Report in Application No. GB2109408.1, dated Dec. 16, 2021, 1 page.
European Patent Office, International Search Report and Written Opinion in Application No. PCT/GB2022/051651, dated Oct. 26, 2022, 9 pages, Rijswijk, Netherlands.

* cited by examiner

*Primary Examiner* — Christopher M Polley
(74) *Attorney, Agent, or Firm* — Marshall & Melhorn, LLC

(57)        ABSTRACT

A fire resistant glazing is provided that seeks to avoid the issue of air gaps forming between a glazing and a frame into which the glazing is placed, a method of manufacturing the fire resistant glazing and the use of same. The fire-resistant glazing includes an intumescent edge mass located at least partially between the first sheet of glazing material and the second sheet of glazing material and which is suitable for, and may be installed within, a glazing frame.

16 Claims, 2 Drawing Sheets

FIRE-RESISTANT GLAZING

BACKGROUND OF THE INVENTION

This invention relates to a fire-resistant glazing, a method of manufacturing said fire-resistant glazing, and the use thereof.

More specifically, the present invention relates to a fire-resistant glazing which comprises an intumescent edge mass and to the manufacture and use thereof.

Fire-resistant glazings generally comprise at least two transparent sheets and at least one fire-resistant interlayer. The transparent sheets are commonly glass sheets, although other transparent materials such as polycarbonates may be used. In many countries, regulations exist specifying the fire resistance of glazings required in commercial and residential settings. Generally, these regulations specify a minimum time for which a glazing must form a barrier to the propagation of fire.

Intumescent layers for fire-resistant glazings may be formed by a cast-in-place method or a pour-and -dry method.

Intumescent layers formed by the cast-in-place method are usually formed by pouring a solution of an intumescent layer precursor between two glass panes. In order for the intumescent layer precursor to be poured between the glass panes, an edge seal is required to form a cavity.

For example, U.S. Pat. No. 5,565,273 A discloses a method for the production of a transparent heat protection element using a hydrous alkali silicate, comprising introducing a pourable composition into a mould cavity between two transparent carrier elements and allowing the composition to cure to form a solid polysilicate layer.

Intumescent layers formed by a pour-and-dry method may be formed directly on the glass pane to be incorporated in the fire-resistant glazing unit.

For example, EP 2557141 B1 discloses a fire protection component which is formed in a planar manner and which is connected to at least one space-bounding surface component.

Alternatively, intumescent layers formed by a pour-and-dry method may be formed on a temporary substrate, and then separated from the temporary substrate and applied as a sheet to the glass pane to be incorporated in the fire-resistant glazing unit.

For example, US 2005016742 A1 discloses a process for the production of a clear flexible film comprising an alkali metal silicate waterglass which comprises spreading a waterglass solution upon the surface of a flexible backing material, drying said solution to form a clear film and separating said film from said backing material.

When used in a commercial or residential building, the fire-resistant glazing is often installed in a frame to form a fire-resistant glazing unit. As a result, in addition to the requirement that a fire-resistant glazing reduces the propagation of fire and/or heat through the glazing, there is also a requirement that fire and/or smoke is not able to pass between the fire-resistant glazing and the frame. As such, during installation of a fire-resistant glazing in a frame it is commonplace to provide either the fire-resistant glazing or the frame within which it is to be installed with an intumescent tape to block the passage of smoke and/or heat though the frame rebate. Once the glazing is installed in the frame and the tape applied, in the event of a fire and upon exposure to high temperatures, the intumescent tape expands and generates a foam and/or a damp course. The foam subsequently fills joints and gaps between the glazing and the frame, thereby closing voids or openings through which heat, smoke, and/or flames may pass or seep. Consequently, the intumescent tape seeks to improve the fire resistance of the glazing and thereby slow the spread of fire through a building.

For example, GB 2394246 B discloses a fire-resistant glazing comprising a panel having an aperture and a glass pane positioned within the aperture such that a marginal edge of the glass pane is received within two opposed recesses in an edge of the panel bordering the aperture, and an intumescent strip is located between the marginal edge of the glass pane and the edge of a panel bordering the aperture.

Likewise, EP 2987938 A1 discloses a fire-resistant glazing door having parallel spaced apart sheets of glass and an edge seal offset inwardly and comprising a glued strip of intumescent material.

However, a disadvantage of known fire-resistant glazings is that an intumescent tape is usually applied either to the edge of the fire-resistant glazing, or to the aperture configured to receive the glazing pane at the point of installation. This makes the installation of a fire-resistant glazing into the aperture time-consuming, and therefore expensive. In addition, in cases of installer error, there is the possibility that the intumescent tape will not be applied either correctly, or even at all. Furthermore, the intumescent tape may be damaged during the installation process. This potentially renders any building fitted with a glazing with such damaged intumescent tape less effective at preventing the transmission of fire, and potentially unsafe, as well as failing to comply with building and/or fire regulations.

Furthermore, some intumescent tapes may not be fully compatible with certain fire-resistant glazings, for example, it is known that in some cases that intumescent tapes may over-expand when exposed to a fire, causing premature fracture or breakage. Alternatively, the selected intumescent tape may not expand sufficiently, thereby failing to prevent the propagation of smoke and/or fire. As such, a glazing provided with an incompatible intumescent tape may fail when applied to glazing, causing the glazing and even the building in which it is installed to fail standard safety protocols required of for example the glazing and building industry.

SUMMARY OF THE INVENTION

Therefore, an object of the present invention, is to overcome or at least mitigate the aforementioned disadvantages. In particular, the present invention aims to provide a fire-resistant glazing which is simple and cost-effective to install, with excellent fire-resistant properties, and which addresses the shortcomings of previous fire resistant glazings.

Another object of the present invention is to provide a fire resistant glazing that seeks to avoid the issue of air gaps forming between a glazing and a frame into which the glazing is placed and/or at the periphery of the glass sheets due to combustion of the sealant, and thereby resist the speed with which the glazing falls or slumps away from the edge of the frame in the event of a fire.

A further object of the present invention is to provide a fire resistant glazing which may be readily installed in a frame to provide an aesthetically pleasing finish.

According to a first aspect of the present invention there is provided a fire-resistant glazing comprising:

at least a first sheet of glazing material comprising a first major face, a second major face and at least one edge face; and at least a second sheet of glazing material comprising a first major face, a second major face and at least one edge face, wherein the first sheet of glazing material and the second sheet of glazing material are arranged in a spaced-apart face-to-face arrangement with the first major faces of the first and second sheet of glazing material facing each other to form a cavity, and wherein the edge faces of the first and second sheets of glazing material are substantially aligned to form a glazing edge; and an intumescent layer located in the cavity between the first sheet of glazing material and the second sheet of glazing material; and wherein the fire-resistant glazing further comprises an intumescent edge mass, and wherein the intumescent edge mass is located at least partially between the first sheet of glazing material and the second sheet of glazing material.

Advantageously, the inventors have discovered that a fire-resistant glazing further comprising an intumescent edge mass located at least partially between the first sheet of glazing material and the second sheet of glazing material allows a larger amount of intumescent edge mass material to be applied when compared to an alternative glazing where intumescent edge mass is not at least partially located between the glazing material sheets. This larger amount of intumescent edge mass material allows the glazing to be used with frames with larger rebates, due to the capability to fill larger frame cavities. Alternatively, if a frame with a larger rebate is not used an intumescent edge mass material may be used that has a lower foaming pressure, and therefore does not apply as great a strain on the glazing.

Therefore, in summary, the inventors of the present invention have provided an improved fire-resistant glazing with an intumescent edge mass which in the event of a fire is capable of intumescing to an acceptable extent.

In addition, the inventors have provided a fire resistant glazing with an intumescent edge mass that may be placed into a frame without the additional requirement of separate intumescent tapes applied at the point of manufacture or installation, thereby reducing the cost and complexity of the glazing installation. As a result, the fire-resistant glazing of the present invention reduces the likelihood of introducing user error into the fire resistant glazing either as a result of the selection of the incorrect intumescent tape or in the application of same.

The fire-resistant glazing according to the present invention is suitable for, and may be installed within, a glazing frame.

In addition, the glazing provided with the intumescent edge mass offers a considerable time saving option for installation over previous solutions at the site of glazing installation.

In addition, where the intumescent edge mass is at least partially between the glazing sheets, the intumescent edge mass is more securely adhered to the glazing and is therefore better able to survive transport from the site of intumescent edge mass application to the glazing installation site.

Preferably, the intumescent edge mass is located at least partially between the first and second sheets of glazing material such that the intumescent mass extends from the glazing edge towards the centre of the glazing a distance from 1 to 10 mm. More preferably the intumescent edge mass is located at least partially between the first and second sheets of glazing material such that the intumescent mass extends from the glazing edge towards the centre of the glazing a distance from 1 to 3 mm. In some cases, an outer boundary of the intumescent edge mass may be substantially aligned with the glazing edge, alternatively an outer boundary of the intumescent edge mass may be between the first faces of the first and second sheets of glazing material.

Preferably, the first sheet of glazing material and/or the second sheet of glazing material comprises glass. Preferably, the first sheet of glazing material and/or the second sheet of glazing material comprise soda-lime silica glass. Glass, in particular soda-lime silica glass is a suitable choice as it is readily available and has excellent optical characteristics. Alternatively, the first and/or the second sheet of glazing material may comprise glass ceramic, such as alumino-silicate and/or boro-silicate glass.

Preferably, the first sheet of glazing material and/or the second sheet of glazing material comprises strengthened glass. The glass may be strengthened by heat treatment, tempering, toughening, chemical strengthening, by addition of foils or laminations, or a combination thereof. For some uses strengthened glass may be particularly required to meet regulations.

Preferably, the first sheet of glazing material and/or the second sheet of glazing material may comprise coatings, such as heat reflective coatings. Such heat reflective coatings may comprise silver and/or transparent conductive oxide materials.

Preferably the intumescent layer comprises alkali silicate. Alkali silicate intumescent layers are readily available, and examples are described in WO 2008/084083, the contents of which are included herein by reference. An alkali silicate intumescent layer may comprise sodium silicate and/or potassium silicate.

Alternatively, the intumescent layer comprises organic hydrogel such as those described in U.S. Pat. No. 4,264,681, the contents of which are included herein by reference.

Preferably the intumescent layer further comprises organic material. Preferably the intumescent layer comprises water.

Preferably the intumescent edge mass expands upon activation by heat. Following expansion of the intumescent edge mass in the event of for example a fire, an insulating and/or cooling foam is produced. Preferably the insulating and/or cooling foam prevents the passage of smoke and/or fire through or around the fire-resistant glazing. Preferably the intumescent edge mass extends substantially around the entire periphery of the fire-resistant glazing in a continuous manner. Alternatively, one or more glazing edges may have a non-continuous intumescent edge mass. For example, interruptions in the intumescent edge mass may be provided to enable installation of the glazing in a frame using glazing packers or wedges.

Preferably the fire-resistant glazing comprises a spacer located between the first sheet of glazing material and the second sheet of glazing material proximate to the glazing edge.

The spacer may comprise materials including, but not limited to, metals, polymers and/or thermoplastics. Example metals include steel, aluminium and titanium. Example polymers include polyethylene (PE), polypropylene (PP), polytetrafluoroethylene (PTFE), polyvinyl chloride (PVC), acrylonitrile butadiene styrene (ABS), polyurethane (PU), polyisobutylene. The spacer may be a thermoplastic spacer. A suitable spacer comprising polyisobutylene is, for example, Ködimelt Thermoplastic Spacer (TPS) available from Kömmerling Chemische Fabrik GMBH.

The spacer may be adhered using a primary sealant, which may comprise a polyisobutylene, such as GD 115 available from Koe-Chemie. The primary sealant preferably prevents ingress of moisture and gas permeation. Alternatively, the spacer may adhere to the glass without any additional sealant, and perform the functions of a primary sealant.

Preferably, the fire-resistant glazing comprises a secondary sealant located between the first sheet of glazing material and the second sheet of glazing. Preferably, the secondary sealant is located between a spacer and the glazing edge.

Preferably the secondary sealant comprises a polysulfide or a derivative thereof, and/or silicone or a derivative thereof, and/or polyurethane or a derivative thereof, and/or a butyl polymer, and/or a "hotmelt". Examples of polysulfides include 2-component polysulfides such as GD 116 available from Koe-Chemie. Examples of silicones include 2-component structural glazing silicone such GD 920 available from Koe-Chemie. Examples of polyurethanes include 2-component polyurethanes such as GD 667 NA available from Koe-Chemie. Examples of "Hotmelts" include isomelt and Ködimelt IG available from Koe-Chemie. The secondary sealant connects the glazing sheets and seals the spacer width hermetically. In order for the secondary sealant to accomplish its functions, it is preferably present in a thickness of greater than or equal to 1 mm.

In some embodiments the intumescent edge mass is substantially entirely located between the first sheet of glazing material and the second sheet of glazing material. This allows the glazings according to the present invention to be readily acceptable to current frames and processes. In such cases, it is preferred that the intumescent edge mass extends from the first sheet of glazing material to the second sheet of glazing material.

Alternatively, the intumescent edge mass protrudes beyond the glazing edge. This allows the intumescent edge mass to expand more quickly in multiple dimensions. In such cases, it is preferred that the intumescent edge mass portion protruding beyond the glazing edge has a width substantially corresponding to the width of the glazing edge. Where the intumescent edge mass protrudes beyond the glazing edge, it preferably protrudes by greater than or equal to 1 mm from the glazing edge. More preferably, where the intumescent edge mass protrudes beyond the glazing edge, it protrudes by greater than or equal to 2 mm from the glazing edge. A greater protrusion distance allows more intumescent edge mass material to be applied, which increases the amount of intumescence and therefore the smoke and/or heat blocking properties of the glazing. However, preferably, where the intumescent edge mass protrudes beyond the glazing edge, it protrudes by less than or equal to 10 mm from the glazing edge. A protrusion distance of greater than 10 mm may produce a glazing that is difficult to transport and install, and the glazing may have to be modified to have a smaller area to fit within a given frame.

Preferably, one or more edge faces on one or more sheets of glazing material is/are provided with the intumescent edge mass. In some cases, one or more second major faces of the sheets of glazing material is/are provided with the intumescent edge mass. However, where one or more second major face is provided with the intumescent edge mass, care must be taken to ensure that it is not visible following installation into the frame.

Preferably, the intumescent edge mass is in direct contact with the first major surface and/or second major surface and/or edge faces of the first and/or second sheets of glazing material. Alternatively, an edge tape may be applied between the glazing material and the intumescent edge mass. Such edge tapes are generally applied as an additional barrier to moisture and/or mechanical damage. Such edge tapes should be thin enough to conform to the profile of the glazing edge and/or the profile of the secondary sealant.

Preferably, the intumescent edge mass is substantially contiguous, meaning that in at least one area where the intumescent edge mass is applied it extends from the first face of the first sheet of glazing material to the first face of the second glazing material, that is across the width of the cavity formed between the sheets of glazing material.

Preferably, the intumescent edge mass extends substantially continuously upon at least one glazing edge, meaning that the intumescent edge mass is located at least partially between the first and second sheets of glazing material along an entire edge with substantially no interruptions.

Preferably, the intumescent edge mass is further provided with a protection layer. The protection layer may preferably be a hard protection layer. In addition, the protection layer may preferably be an extruded protection layer. Preferably the protection layer may cover the intumescent edge mass partially or completely. Preferably the protection layer may be a mechanical protection layer. Preferably the protection layer may be a water-resistant protection layer. In addition, the protection layer may be removable, or may melt readily during a fire incident to expose the intumescent edge mass. The protection layer may comprise thermoplastic polymers, such as poly(methyl methacrylate) (PMMA), cellulose acetate (CA), cellulose acetate butyrate (CAB), polyamide (PA), polybutylene succinate (PBS), polyethersulfone (PES), polystyrene (PS), polyhydroxyalkanoate (PHA), polyhydroxybutyrate (PHB). Alternatively, or in addition, the protection layer may comprise waxes, varnishes, resins or paints, such as thermoplastic acylate lacquers.

Preferably, the secondary sealant where present includes at least one groove parallel to the glazing edge. The at least one groove parallel to the glazing edge may extend along substantially the entire glazing edge, and form a channel between the sheets of glazing material within which the intumescent edge mass is at least partially located.

Alternatively, where no secondary sealant is present the intumescent layer may include at least one groove parallel to the glazing edge. The at least one groove parallel to the glazing edge may extend along substantially the entire glazing edge, and form a channel between the sheets of glazing material within which the intumescent edge mass is at least partially located.

Preferably, the intumescent edge mass comprises a paste, putty, mastic or caulk. Preferably the intumescent edge mass does not comprise an intumescent strip. As used herein an intumescent strip is a material applied as a solid strip, generally from a roll or sheet, such as a perforated sheet. The inventors have discovered that the application of such strips between the glazing sheets leads to poor results, because it is difficult to size the strip correctly to completely fill the recess or groove between the sheets. In addition, such strips are often thick and dense, which means that they do not conform readily to the profile of the glazing edge and/or the profile of the secondary seal. These factors lead to the incorporation of air gaps within the fire-resistant glazing edge region, which are prone to expansion, separating the tape from the glazing and leaving a passage through which smoke and/or heat may pass. Furthermore, strips are often applied as tapes using adhesives, which may fail during a fire incident, again causing a passage through which smoke and/or heat may pass. In addition, such adhesives may not survive transport and or handling of the fire-resistant glazing, necessitating the application of a strip or tape at the installation site, which is undesirable as discussed above.

The intumescent edge mass comprises an intumescent material, preferably with a binder. For example, a silicate or phosphate intumescent material may be used, such as those described in Zybina O., Gravit M. (2020) "Basic Ingredients of Intumescent Compositions" in: "Intumescent Coatings for Fire Protection of Building Structures and Materials", Springer Series on Polymer and Composite Materials. Springer, Cham.

Alternatively, intumescent material comprising a water stable fire-resistant material may be used, produced by mixing at least two precursor components together with subsequent hardening, wherein a first of the at least two precursor components comprises at least one waterglass; and a second of the at least two precursor components comprises at least one waterglass hardener; and at least one of the precursor components comprises a cooling agent and/or an insulating agent; and the waterglass is present in a concentration range of from 2 to 100% by weight, as described in WO 2016189292 A1.

Alternatively, the intumescent material may be graphite, preferably exfoliated graphite. Fire-resistant glazings comprising an intumescent edge mass comprising exfoliated graphite are advantageous, because such materials are water-resistant and are therefore more likely to survive transport and/or handling and/or installation.

Preferably the composition of the intumescent edge mass and the intumescent layer are different.

Preferably, the intumescent edge mass has a minimum reaction temperature of between 90° C. and 220° C. More preferably, the intumescent edge mass has a minimum reaction temperature of between 120° C. to 175° C. Even more preferably, the intumescent edge mass has a minimum reaction temperature of between 130° C. to 150° C.

Also, in relation to the intumescent edge mass for the fire-resistant glazing according to the present invention, preferably, the intumescent edge mass comprises a foaming pressure of at least 0.7 N/mm$^2$. Further, the intumescent edge mass preferably has an expansion ratio of from 3 to 30. More preferably, the intumescent edge mass has an expansion ratio of from 10 to 25. Even more preferably, the intumescent edge mass has an expansion ratio of from 10 to 20.

Also, for the fire-resistant glazing according to the present invention, the intumescent edge mass preferably has a density of from 800 kg/m$^3$ to 1900 kg/m$^3$. More preferably the intumescent edge mass has a density of from 1200 kg/m$^3$ to 1500 kg/m$^3$. Even more preferably the intumescent edge mass has a density of from 1300 kg/m$^3$ to 1450 kg/m$^3$.

For the fire-resistant glazing according to the present invention the intumescent edge mass may expand randomly; in addition, the intumescent edge mass may expand in three or more directions. Preferably, the intumescent edge mass has a three-dimensional direction of action. A three-dimensional intumescent edge mass increases in both height and width and is therefore more likely to expand to fill a frame rebate than a two-dimensional intumescent edge mass.

Preferably, the intumescent edge mass is water-resistant. A water-resistant intumescent edge mass is more likely to survive transport and handling.

Further, in relation to the present invention the fire-resistant glazing may further comprise a primer. Preferably the primer is provided between the intumescent edge mass and the first and or second faces of the sheets of glazing material. Alternatively, or in addition, the primer may be provided between the intumescent edge mass and one or more spacer, and/or sealant and/or enamel coating. The primer may preferably aid adhesion between the intumescent edge mass and the: sheets of glazing material; one or more spacer; sealant; and/or enamel coating.

In addition, in relation to the fire-resistant glazing according to the present invention, the first major face of the first sheet of glazing material and/or the first major face of the second sheet of glazing material may comprise an enamel coating. Preferably, the enamel coating is located between the first major face of the first and/or second sheets of glazing material and one or more spacer; and/or the intumescent layer; and/or sealant; and/or the intumescent edge mass.

According to a second aspect of the present invention there is provided a method of manufacturing a fire-resistant glazing comprising the steps of:

(i) providing a semi-finished fire-resistant glazing comprising:

at least a first sheet of glazing material comprising a first major face, a second major face and at least one edge face; at least a second sheet of glazing material comprising a first major face, a second major face and at least one edge face, wherein the first sheet of glazing material and the second sheet of glazing material are arranged in a spaced-apart face-to-face arrangement with the first major faces of the first and second sheet of glazing material facing each other to form a cavity, and wherein the edge faces of the first and second sheets of glazing material are substantially aligned to form a glazing edge; and an intumescent layer located in the cavity between the first sheet of glazing material and the second sheet of glazing material; and (ii) further applying an intumescent edge mass at least partially between the first sheet of glazing material and the second sheet of glazing material.

A semi-finished fire-resistant glazing may be provided by a cast-in-place process or a pour-and-dry process. The semi-finished fire-resistant glazing may be suitable for installation in a glazing frame as a fire-resistant glazing, or may require additional components in order to be suitable for installation in a glazing frame.

Preferably, the semi-finished fire-resistant glazing comprises a secondary sealant and prior to the step of applying the intumescent edge mass, a portion of the secondary sealant is removed to form a groove that is substantially parallel to the glazing edge. Preferably the secondary sealant is between the first sheet of glazing material and the second sheet of glazing material.

Preferably, the portion of the secondary sealant is removed using a knife, scraper or other implement.

Preferably, the semi-finished fire-resistant glazing comprises a spacer proximate to the glazing edge. Preferably the secondary sealant is between the spacer and the glazing edge.

Preferably, the semi-finished fire-resistant glazing is manufactured using a cast-in-place method, wherein the intumescent layer is provided within a boundary defined by spacers. Where the semi-finished fire-resistant glazing is manufactured using a cast-in-place method, the semi-finished fire-resistant glazing preferably comprises a secondary sealant.

Alternatively, the semi-finished fire-resistant glazing is manufactured using a pour-and-dry process. Where the semi-finished fire-resistant glazing is manufactured using a pour-and-dry process, a portion of the intumescent layer may be removed to form a groove that is substantially parallel to the glazing edge. Preferably, the portion of the intumescent layer is removed using a knife, scraper or other implement.

The intumescent edge mass may be applied between the glazing sheets using, for example, a pallet knife, a caulking gun or other suitable tools depending on the type and consistency of the intumescent edge mass material.

The intumescent edge mass may be applied into a groove in a secondary sealant or a groove in an intumescent layer using, for example, a pallet knife, a caulking gun or other suitable tools depending on the type and consistency of the intumescent edge mass material.

Preferably, a protective layer is applied to the intumescent edge mass after application of the intumescent edge mass and wherein the protection layer is removed prior to installation of the fire-resistant glazing.

According to a third aspect of the present invention, there is provided a use of a fire-resistant glazing according to the first aspect of the present invention, and/or manufactured according to the second aspect of the present invention as described above, to prevent the spread of fire and/or smoke through a building.

Regulations classify the fire resistance of glazings by the measurement of the minimum time for which a glazing maintains: (i) its structural integrity (termed E); (ii) its structural integrity and radiation reduction within specified limits (termed EW); and (iii) its structural integrity and insulation within specified limits (termed EI) when exposed to a fire. Standard tests to determine the classification of the fire resistance of glazing are known and typically involve exposing the one side of the glazing unit (the "fire side" or "hot side") to a fire and monitoring the integrity of the glazing, and/or temperature levels on the opposing side of the glazing (the "cold side") over time.

Preferably, the fire-resistant glazing according to the present invention conforms to at least E 30 standard, preferably at least E 60 standard, more preferably is at least E 120 standard, measured according to DIN EN 13501-2.

Preferably, the fire-resistant glazing according to the present invention conforms to at least EI 15 standard, preferably at least EI 30 standard, more preferably at least EI 60 standard, measured according to DIN EN 13501-2.

Preferably, the fire-resistant glazing according to the present invention conforms to at least EW 30 standard, preferably at least EW 60, more preferably at least EW 90, measured according to DIN EN 13501-2.

For maritime glazings, glazings may be classified using A and B standards according to IMO A.754(18).

Preferably, the fire-resistant glazing according to the present invention conforms to at least A0 standard, preferably at least A15, more preferably at least A30, yet more preferably A60 according IMO A.754(18).

Preferably, the fire-resistant glazing according to the present invention conforms to at least B0 standard, preferably at least B15, according to IMO A.754(18).

For trains and transportation glazings may be classified using A1 and A2 standards according to EN 45545 part 3.

Preferably, the fire-resistant glazing according to the present invention conforms to at least A1-15 standard, preferably at least A1-30 standard, according to EN 45545 part 3.

Preferably, the fire-resistant glazing according to the present invention conforms to at least A2-15 standard, preferably at least A2-30 standard, according to EN 45545 part 3.

It will be appreciated that all features described in relation to the first aspect of the present invention also apply in respect of the second and third aspects of the present invention, and vice versa.

BRIEF DESCRIPTION OF THE FIGURES

Embodiments of the present invention will now be described by way of example only with reference to the following accompanying drawings, in which.

DETAILED DESCRIPTION OF THE INVENTION

Figure 1:
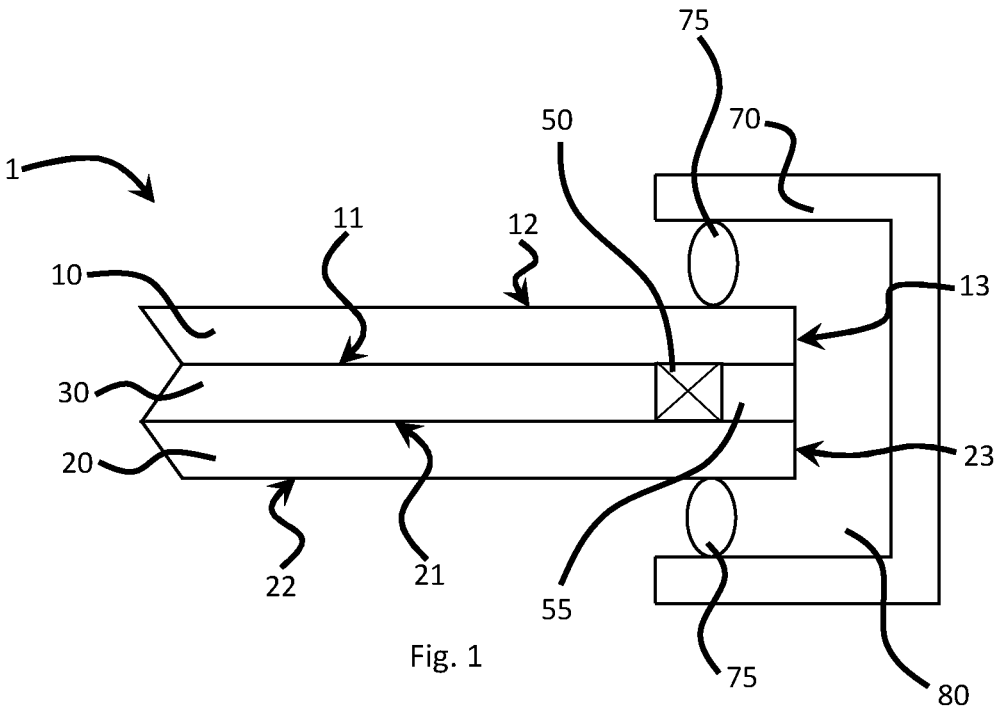
FIG. 1 illustrates a schematic cross-sectional view of a conventional fire-resistant glazing.

In relation to FIG. 1 there is provided a conventional fire-resistant glazing 1 which comprises a first sheet of glazing material 10 comprising a first major face 11, a second major face 12 and an edge face 13; and a second sheet of glazing material 20 comprising a first major face 21, a second major face 22 and an edge face 23. The second sheet of glazing material 20 is in a spaced-apart face-to-face arrangement with the first sheet of glazing material 10 and the first major face 11 of the first sheet of glazing material 10 faces the first major face 21 of the second sheet of glazing material 20.

The fire-resistant glazing 1 further comprises an intumescent layer 30 located between the first sheet of glazing material 10 and the second sheet of glazing material 20.

A spacer 50, is provided between the sheets of glazing material 10, 20. The spacer is conventionally provided to maintain the distance between the first and second sheets of glazing material 10, 20. Spacers are often provided around substantially the entire periphery of the glazing. In addition, the spacer 50 may help to reduce the ingress of air, which may cause the intumescent layer 30 to become hazy or discoloured and thereby reduce visibility through the fire-resistant glazing 1 over time.

A secondary sealant 55 is provided between the sheets of glazing material. The secondary sealant 55 is conventionally applied to provide mechanical stability to the glazing such that the glazing sheets are not separated during handling and transport. In addition, the secondary sealant 55 helps to reduce the ingress of air, which may cause the intumescent layer 30 to become hazy or discoloured and thereby reduce visibility through the fire-resistant glazing 1 over time.

The fire-resistant glazing 1 is mounted within a frame 70, and held in place using beads 75. The beads may be solid, such as a rubber, or a putty or mastic. A frame cavity 80 is formed between the fire-resistant glazing 1, the frame 70, and the beads 75.

While this conventional glazing has many advantages, it suffers from the drawbacks described above. In particular, during a fire incident this frame cavity 80 may provide a conduit for heat and/or smoke around the fire-resistant glazing 1.

In the following further embodiments of the first aspect of the present described in relation to FIGS. 2 to 4, like numbers are used to represent features that are equivalent to the first embodiment depicted by FIG. 1. In the following FIGS. 2 to 4 the glazing frame 70, beads 75, and frame cavity 80 are not shown-however, the skilled person will readily appreciate that the fire-resistant glazings shown in FIG. 2-4 may be readily incorporated in a glazing frame in the same manner as that depicted in FIG. 1.

Figure 2:
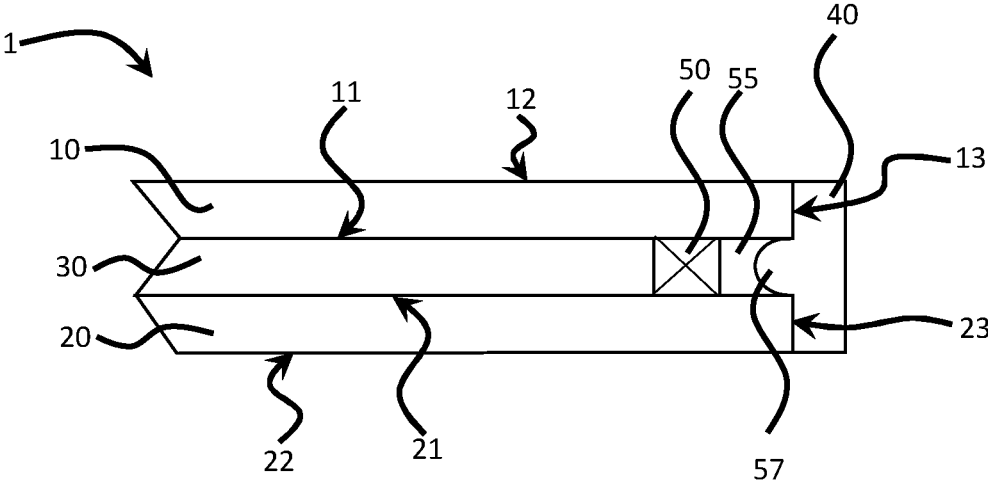
FIG. 2 illustrates a schematic cross-sectional view of a fire-resistant glazing according to a first embodiment of the present invention.

FIG. 2 illustrates a schematic cross-sectional view of a fire-resistant glazing 1 according to a first embodiment of the present invention.

The fire-resistant glazing 1 according to the first embodiment of the present invention is constructed in a similar manner to the conventional fire-resistant glazing of FIG. 1. However, the fire-resistant glazing 1 further comprises an intumescent edge mass 40, and the intumescent edge mass 40 is located at least partially between the first sheet of glazing material 10 and the second sheet of glazing material 20.

The intumescent edge mass 40 preferably substantially fills any gap arising between the first and second sheets of glazing material 10, 20 such that no air gaps are present between he first and second sheets of glazing material 10, 20.

The fire-resistant glazing according to the first embodiment of the present invention may include a groove 57 parallel to the glazing edge formed either in the secondary sealant 55 and/or by recessing the secondary sealant 55. The intumescent edge mass 40 preferably substantially fills the groove 57 such that it is located at least partially between the first sheet of glazing material 10 and the second sheet of glazing material 20.

The groove 57 may be formed by partial removal of the secondary sealant 55 using a tool either before, during or after curing the secondary sealant 55. Depending on the profile of the tool used to create the groove 57, the profile of the secondary sealant 55 may be convex, concave, or a combination thereof following curing.

For example, as depicted in in FIG. 2, the secondary sealant 55 may be provided with a concave profile. Where secondary sealant 55 is provided with a concave profile and the groove is sufficiently wide that both the first faces 11, 21 of the first and second sheets of glazing material 10, 20 are exposed, the intumescent edge mass may preferably extend between surfaces 11 and 21. In such an arrangement, the intumescent edge mass is described herein as "contiguous" and the intumescent edge mass may be entirely located within groove 57, be aligned with edge faces 13 and 23, or may extend beyond edge faces 13 and 23. A contiguous intumescent edge mass 40 may also be formed where the secondary sealant is recessed from the glazing edge.

Alternatively, where the secondary sealant 55 is provided with a concave profile and the groove 57 is narrow and the secondary sealant 55 is not recessed from the glazing edge, the intumescent edge mass 40 may not contact the first faces 11, 21 of the first and second sheets of glazing material 10, 20.

Alternatively, where the secondary sealant 55 is provided with a convex profile, the intumescent edge mass 40 may be provided on each surface 11 and 21 with a separation between the intumescent edge mass 40 sections on each surface, such an intumescent edge mass 40 is referred to herein as "non-contiguous".

The groove 57 may be formed by using a tool following application of the secondary sealant 55, or by not completely filling the void between the first and second sheets of glazing material 10, 20 with secondary sealant 55 during application. Incomplete filling of the void between the first and second sheets of glazing material 10, 20 with secondary sealant may include the use of a nozzle or a mask.

As illustrated in FIG. 2, the intumescent edge mass 40 may protrude beyond one or both of the edge faces 13, 23 of the sheets of glazing material 10, 20. Hereafter, such an arrangement of the intumescent edge mass 40 is described as "protruding" with respect to the first and second sheets of glazing material respectively. Alternatively the intumescent edge mass 40 may be entirely located between the sheets of glazing material 10, 20 and as such may not extend beyond the one or both edge faces 13, 23 of the sheets of glazing material 10, 20. Hereafter, such an arrangement of the intumescent edge mass 40 is described as "recessed" with respect to the first and second sheets of glazing material respectively. Alternatively, the intumescent edge mass may be aligned with one or both edge faces 13, 23 of the sheets of glazing material 10, 20. Hereafter, such an arrangement of the intumescent edge mass 40 is described as "aligned" with respect to the first and second sheets of glazing material respectively.

It is generally preferable that the intumescent edge mass 40 is protruding, such that it may expand more quickly and in multiple directions to provide a cooling and/or heat/smoke blocking foam that fills any air gap between the glazing and a frame. However, an intumescent edge mass 40 that is recessed or aligned may be more compatible with some frame designs.

Where the glazing comprises multiple sheets of glazing material arranged in a repeating pattern separated by multiple cavities and/or intumescent layers, preferably a portion of intumescent mass is between some or all of the first major faces of the sheets of glazing material. In addition, such intumescent edge masses may be contiguous or non-contiguous and may preferably be recessed or protruding beyond edge faces 13 and 23. The additional cavities may comprise intumescent layers, insulating gases such as argon, or vacuum. For example, the glazing may be a multiple, for example triple, glazing unit incorporating at least one fire-resistant intumescent layer and one or more gas filled cavities.

In FIG. 2, the edge faces 13, 23 of the sheets of glazing material 10, 20 are provided with an intumescent edge mass 40. Preferably, the intumescent edge mass extends substantially along the entire length of each glass sheet. The intumescent edge mass may be continuous or intermittent, i.e. non-continuous, along the length of each glass edge.

Figure 3:
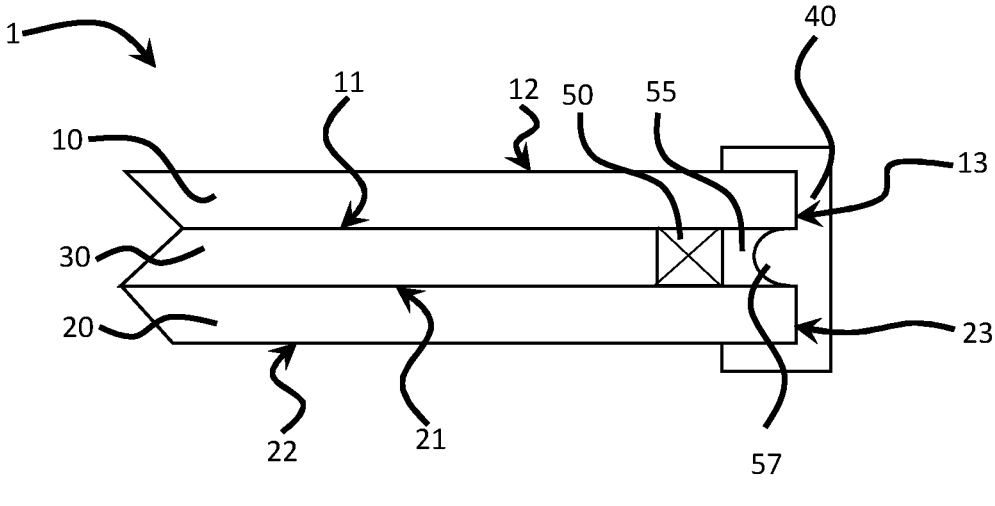
FIG. 3 illustrates a schematic cross-sectional view of a fire-resistant glazing according to a second embodiment of the present invention.

In FIG. 3, the second major faces 12, 22 of the first and second sheets of glazing material are provided with an intumescent edge mass 40.

Such an arrangement is advantageous, as the intumescent edge mass 40 preferably both covers and protects the edges 13, 23 of the sheets of glazing material 10, 20, and encapsulates the edge region of the fire-resistant glazing. However, the intumescent edge mass 40 should not be applied upon the second major face 12, 22 to the extent that it is visible when installed in the frame (not shown). In particular, it should not extend beyond the glazing beads (not shown).

Figure 4:
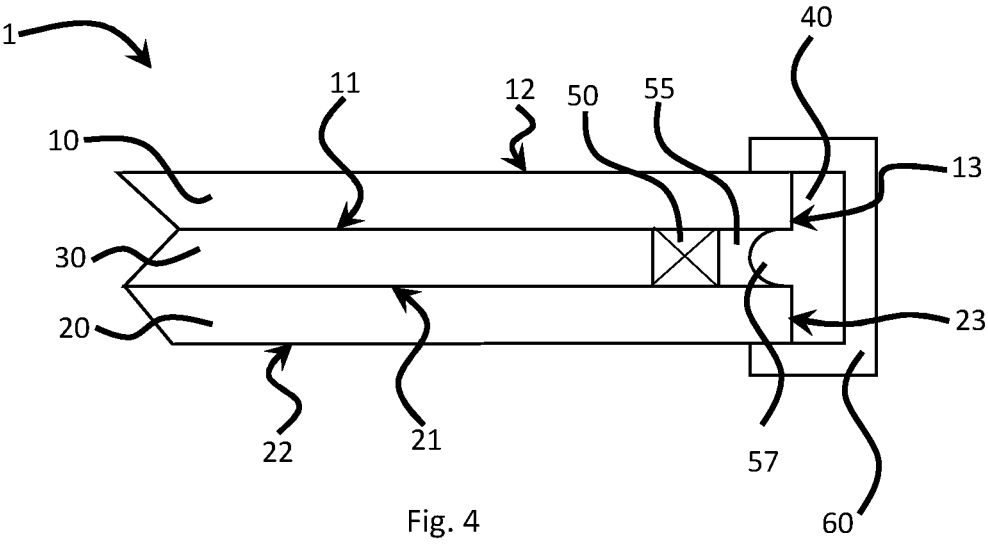
FIG. 4 illustrates a schematic cross-sectional view of a fire-resistant glazing according to a third embodiment of the present invention.

FIG. 4 depicts an embodiment of the invention wherein the intumescent edge mass 40 is provided with a protection layer 60. Such a protection layer 60 protects the fire-resistant glazing 1 during storage, transportation and installation. Preferably, the protection layer 60 is provided across the entire exposed surface of the intumescent edge mass 40. Preferably, the protection layer 60 is removed prior to installation of the glazing 1. Alternatively, the protection layer remains upon the intumescent edge mass 40 following installation of the glazing 1, but does not impair the intumescent response of the intumescent edge mass upon exposure to heat or fire.

In FIGS. 2, 3 and 4 fire-resistant glazings including a spacer and a secondary seal are depicted. However, the skilled person will readily appreciate upon consideration of the figures and the specification that a groove may be formed in an intumescent layer in a similar fashion, where a spacer and secondary seal are not provided. Therefore, all features relating to grooves in secondary sealants may also be applied to grooves in intumescent layers to allow an intumescent edge mass to be provided between the sheets of glazing material.

In a further modification of each of the embodiments described above, one or more of the first major faces of each sheet of glazing material may comprise an enamel coating (not shown). The enamel coating may also extend around the periphery of one or more sheets of glazing material in the fire resistant glazing. Enamel coatings may provide an aesthetically pleasing edge region to the fire-resistant glazing. The enamel coating may also protect the primary and/or secondary seals from degradation by UV light. When applied, the enamel coating may extend from between 15 mm to 20 mm from the edge of the sheet of glazing material.

Whilst an enamel coating is not shown in the figures, each recited embodiment may be compatible with an enamel coating. As such, an enamel coating may be present between the intumescent edge mass and the sheet of glazing material without a reduction in fire-resistant properties of the fire resistant glazing.

In addition, whilst edge faces 13, 23, are illustrated substantially aligned, alternatively, the edge face of one or more sheets of glazing may protrude out of alignment with the edge face of a second or further sheet of glazing material. That is, the sheets of glazing material may be staggered. That is, each embodiment may be provided with aligned sheets of glazing material, or staggered sheets of glazing material. Nevertheless, the skilled person will readily appreciate that such an arrangement results in a glazing edge that may be offered to the frame during installation.

Whilst in the embodiments described above only two sheets of glazing material are depicted, the embodiments of the present invention described also cover embodiments of fire resistant glazings with three, four, or more sheets of glazing material.

In addition, the embodiments described above may form a part of or a whole fire-resistant glazing. That is, the embodiments may be repeated, or combined together, to form fire-resistant glazings with multiple intumescent layers and/or multiple intumescent edge mass portions. This arrangement is particularly beneficial when fire-resistant glazings are required which provided longer fire-resistance time.

The inventive glazings according to the present invention may be provided with an edge tape for encapsulating the edge of the glazing to prevent water ingress. The intumescent edge mass may be applied under the edge tape, or over the edge tape. However, where the intumescent edge mass is applied under the edge tape, the intumescent edge mass must have a high enough foaming pressure to expand through the tape. Alternatively, the tape should be perforated in the area of the intumescent edge mass to allow expansion through the tape. Such edge tapes should be sufficiently thin and flexible to conform to the profile of the glazing edge and/or the profile of the secondary seal, to prevent trapping air within the glazing edge region.

A further advantage of the present invention is that the intumescent edge mass protects the secondary sealant from decomposition in the event of a fire, and upon foaming forms a tertiary barrier such that the intumescent edge mass may substantially retain the intumescent layer within the fire-resistant glazing for a longer time than a comparable fire-resistant glazing without the intumescent edge mass, while still providing fire protection with the glazing rebate area. This leads to an increased lifetime of the glazing unit because the fire is not able to move around the edges, and premature release of the intumescent layer into the rebate area can be reduced.

However, in some cases it is desirable for the intumescent layer and/or gases evolved by the intumescent layer during a fire incident to vent into the rebate area. To allow the controlled venting of intumescent layer and/or gases evolved by the intumescent layer during a fire incident, in some embodiments the intumescent edge mass is non-continuous, such that the intumescent edge mass is either not present or not contiguous at a portion of the glazing edge. Preferably, where the intumescent edge mass is non-continuous, preferably the area where the intumescent edge mass is not present or is non-contiguous is proximate to a glazing corner. The frame at the corner is better able to withstand venting pressure, as opposed to frame edges which may bow or crack under venting pressure, which may allow the passage of smoke and/or heat. In addition, the area where the intumescent edge mass is not present or is non-contiguous should not be proximate to glazing hinges, as these may be damaged by venting pressure, thereby allowing the glazing to move which may allow the passage of smoke and/or heat.

In some embodiments at least 60%, preferably at least 80%, of the length of at least one glazing edge comprises intumescent edge mass and the at least one glazing edge comprises an area where the intumescent edge mass is not present. In some embodiments at least 60%, preferably at least 80%, of all glazing edges comprise intumescent edge mass and all glazing edges comprise an area where the intumescent edge mass is not present.

In some embodiments at least 60%, preferably at least 80%, of the length of at least one glazing edge comprises intumescent edge mass and the at least one glazing edge comprises an area where the intumescent edge mass is not contiguous. In some embodiments at least 60%, preferably at least 80%, of all glazing edges comprise intumescent edge mass and all glazing edges comprise an area where the intumescent edge mass is not contiguous.

As used herein, proximate to a glazing corner is defined as within 10% of the length of the glazing edge length. As used herein, proximate to a glazing hinge is defined as within 10% of the length of the glazing edge.

EXAMPLES

Fire resistant glazings according to the present invention were prepared as illustrated in FIG. 2 with two sheets of 6 mm toughened float glass arranged with 6 mm of intumescent material located therebetween. The glazing included a thermoplastic spacer and a secondary sealant of polysulfide. A portion of the secondary sealant was removed by tooling to form a groove parallel to the glazing edge and the intumescent edge mass was applied over the edge faces of the sheets of glazing material and also over secondary sealant within the groove.

A range of different intumescent edge mass materials were tested. These included Kerafix Firestop Putty, Roku 1000, PYRO-SAFE DG-SC, and Roku AC, each obtainable from Rolf Kuhn GmbH.

The example glazings were fixed into a frame using a rack such that the edges of the glazing were visible, and it was observed that for each glazing an air gap of around 5 cm was present between the edge of the glazing and the frame.

The glazings were then submitted to a fire test according to safety standard Class EI, in accordance with EN 138501-1, incorporated herein by reference, wherein a flame is applied to the glazing using a burner. When the fire test was initiated the light from the flame was observed through the air gap.

In a comparative example, constructed as in FIG. 1 in which no intumescent edge mass is applied to the glazing, the air gap remains throughout the fire test, and is not sealed. Heat and smoke may pass between the glazing edge and the frame.

However, when glazings according to the present invention incorporating the intumescent edge mass were tested, the gap was filled with intumescent foam which prevents the passage of heat and/or smoke.

The intumescent edge mass materials were applied as 4 mm lines to a glass sheet not incorporated in a fire-resistant glazing to investigate their expansion. This test involved heating each intumescent edge mass material to 450° C. for 30 minutes without a load. The properties of intumescent mass materials are provided below in table 1.

2. A fire-resistant glazing according to claim 1, wherein the intumescent edge mass is entirely located between the first sheet of glazing material and the second sheet of glazing material.

3. A fire-resistant glazing according to claim 1, wherein the intumescent edge mass protrudes beyond the glazing edge.

4. A fire-resistant glazing according to claim 3, wherein one or more edge faces on one or more sheets of glazing material is/are provided with the intumescent edge mass.

5. A fire-resistant glazing according to claim 4, wherein one or more second major faces of the sheets of glazing material is/are provided with the intumescent edge mass.

6. A fire-resistant glazing according to claim 1, wherein the intumescent edge mass is in direct contact with the first major surface of the first and/or second sheets of glazing material.

7. A fire-resistant glazing according to claim 1 wherein the intumescent edge mass is substantially continuous on at least one glazing edge.

8. A fire-resistant glazing according to claim 1, wherein the intumescent edge mass is further provided with a protection layer.

TABLE 1

| Intumescent Mass Material | Density $kg/m^3$ | Reaction temperature | Expansion Ratio | Foaming Pressure $N/mm^2$ | Direction of action | Intumescent Material | Water Resistant |
|---|---|---|---|---|---|---|---|
| Kerafix Putty | 1390 | 140 | 14.5-20 | >0.8 | Three-dimensional | Acrylate | No |
| Roku 1000 | 1250 | 185 | 6-10 | >0.3 | Three-dimensional | Graphite | No |
| Roku AC | 1360-1840 | 200 | 1.9-5 | 0 | Two-dimensional | Acrylate | No |
| PYRO-SAFE DG-SC | 1300 | 150 | 15-26.5 | 1.00-1.90 | Three-dimensional | Graphite | Yes |

The invention claimed is:

1. A fire-resistant glazing comprising:

at least a first sheet of glazing material comprising a first major face, a second major face and at least one edge face; and at least a second sheet of glazing material comprising a first major face, a second major face and at least one edge face, wherein the first sheet of glazing material and the second sheet of glazing material are arranged in a spaced-apart face-to-face arrangement with the first major faces of the first and second sheet of glazing material facing each other to form a cavity, and wherein the edge faces of the first and second sheets of glazing material are substantially aligned to form a glazing edge;

an intumescent layer located in the cavity between the first sheet of glazing material and the second sheet of glazing material; and wherein the fire-resistant glazing further comprises:

a spacer located between the first sheet of glazing material and the second sheet of glazing material proximate to the glazing edge;

a secondary sealant located between the first sheet of glazing material and the second sheet of glazing material, and an intumescent edge mass located at least partially between the first sheet of glazing material and the second sheet of glazing material, wherein the secondary sealant includes at least one groove parallel to the glazing edge in which the intumescent edge mass is at least partially located.

9. A fire-resistant glazing according to claim 1, wherein the intumescent edge mass comprises a water-resistant intumescent material.

10. A fire-resistant glazing according to claim 1, wherein the intumescent edge mass comprises a paste, putty, mastic or caulk.

11. A fire-resistant glazing according to claim 1, wherein the intumescent edge mass is not applied as a solid strip or tape.

12. A fire-resistant glazing according to claim 1, wherein the intumescent edge mass has a minimum reaction temperature of between 90° C. and 220° C.

13. A fire-resistant glazing according to claim 1, wherein the intumescent edge mass has a foaming pressure of at least 0.7 $N/mm^2$, and/or wherein the intumescent edge mass has an expansion ratio of from 3 to 30, and/or wherein the intumescent edge mass has a density of from 800 $kg/m^3$ to 1900 $kg/m^3$.

14. A fire-resistant glazing according to claim 1, wherein the intumescent edge mass has a three-dimensional direction of action.

15. A fire-resistant glazing according to claim 1, wherein the intumescent edge mass is non-continuous upon at least one glazing edge.

16. A fire-resistant glazing according to claim 15, wherein an area where the intumescent edge mass is not present is proximate to a glazing corner and/or not proximate to a glazing hinge.

* * * * *